United States Patent [19]

Thayer

[11] 4,382,551
[45] May 10, 1983

[54] FLAP-TYPE NOZZLE WITH BUILT-IN REVERSER

[75] Inventor: Edward B. Thayer, Hobe Sound, Fla.

[73] Assignee: United Technologies Corporation, Hartford, Conn.

[21] Appl. No.: 264,726

[22] Filed: May 18, 1981

[51] Int. Cl.³ .............................................. F02K 11/60
[52] U.S. Cl. ............................. 239/265.29; 60/226.2; 244/110 B
[58] Field of Search ................... 239/265.25–265.29, 239/265.39; 244/12.5, 23 D, 110 B; 60/226 A, 229, 230

[56] References Cited

U.S. PATENT DOCUMENTS

| | | | |
|---|---|---|---|
| 2,972,226 | 2/1961 | Geary | 239/265.39 |
| 3,690,561 | 9/1972 | Potter | 239/265.29 |
| 3,973,731 | 8/1976 | Thayer | 239/265.29 X |

Primary Examiner—Andres Kashnikow
Attorney, Agent, or Firm—Stephen E. Revis

[57] ABSTRACT

A lightweight exhaust nozzle/thrust reverser for a gas turbine engine comprises a flap-type exhaust nozzle with a thrust reverser door built into a cutout within each flap. The flaps may be hinged at their forward edges to the engine exhaust duct and may either be actuated or may float freely. Preferably, when the reverser doors are stowed they blend smoothly with the internal and external surfaces of the flaps. Actuation means deploys the doors such that they extend into the gas flow path and coact with each other to form a wall which blocks the axial flow of gas, and they simultaneously open the cutout within which they are disposed and redirect the exhaust gas through the cutouts in an upstream direction. In a preferred embodiment the flaps define the divergent portion of a convergent/divergent exhaust nozzle.

10 Claims, 5 Drawing Figures

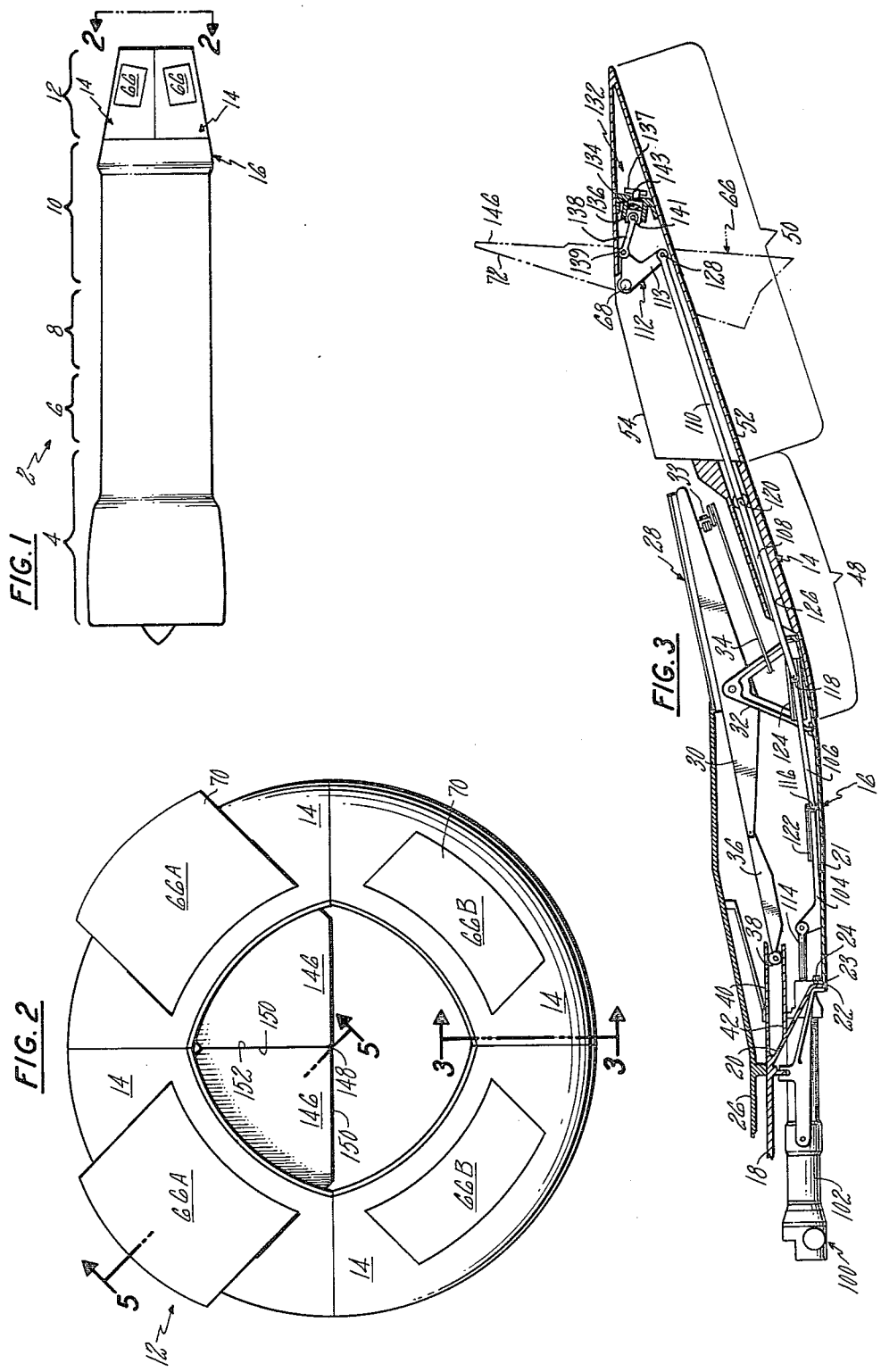

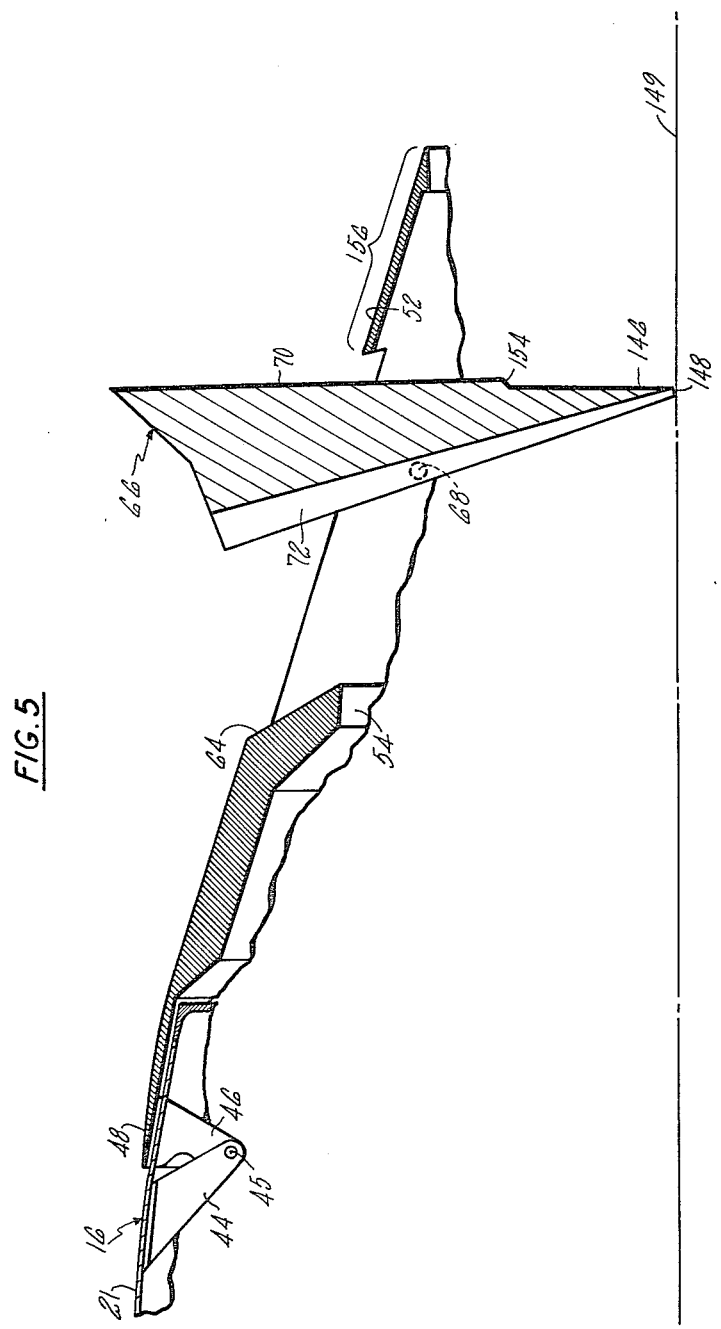

FLAP-TYPE NOZZLE WITH BUILT-IN REVERSER

TECHNICAL FIELD

This invention relates to thrust reversers for gas turbine engines.

BACKGROUND ART

Gas turbine engines incorporated in military and commercial aircraft often include variable area exhaust nozzles as well as thrust reversing systems. The thrust reversers are generally required to be add-on equipment which, unfortunately, increases drag and substantially increases the weight and complexity of the engine and/or airframe. Typically, a thrust reverser system comprises a plurality of movable doors or flaps supported and carried by engine case or airframe structure. The doors are either moved by linkages or pivot on hinges into the engine exhaust gas stream to block all or a portion of the gas stream and to redirect the gas stream in a generally forward direction to slow the aircraft.

Some U.S. patents representative of the state of the art of thrust reverser systems are: U.S. Pat. Nos. 2,970,432; 3,153,321; 3,608,314; 3,690,561; 3,973,731; and 4,093,122.

DISCLOSURE OF INVENTION

One object of the present invention is a thrust reverser system for a gas turbine engine having a variable area exhaust nozzle.

Another object of the present invention is a lightweight thrust reverser system.

A further object of the present invention is a low drag thrust reverser system.

Accordingly, a thrust reverser door is built into each of a plurality of axially extending flaps which form a variable area exhaust nozzle for a gas turbine engine, wherein the reverser door in each flap is movable between a stowed position wherein it closes a cutout in the flap and a deployed position wherein the cutout is open and the deployed door extends into the engine flow path and, in combination with the other deployed doors, blocks and redirects at least a portion of the gas flow in an upstream direction through the flap cutouts.

One of the main features of this invention is that each thrust reverser door is a part of and is carried by one of the nozzle flaps of the already existing variable area exhaust nozzle. Each door, in its stowed position, closes a cutout in its respective flap and becomes part of the low drag internal and external surface of the nozzle flap. Elimination of the need for separate structure to carry the reverser doors results in a significant weight savings and drag reduction.

In a preferred embodiment the nozzle flaps are hinged near their upstream ends and are movable between a closed position wherein they define a minimum exhaust nozzle exit area (for cruise and other low power modes) and an open position wherein they define a maximum exhaust nozzle exit area (for takeoff and other high power modes). Typically the thrust reverser doors would be deployed during approach and landing when the exhaust nozzle is in its closed, minimum throat area position. Each reverser door is disposed within a cutout in one of the nozzle flaps and is preferably hinged for rotation about an axis dividing the door into fore and aft portions. The door can thereby rotate from its stowed position flush with the flap to its deployed position wherein its aft portion extends into the gas flow path while its fore portion extends radially outwardly away from the nozzle axis in an upstream direction and opens the cutout in the nozzle flap. The aft portion of each door tapers axially rearwardly to form a point at its rearward end. When fully deployed the pointed end of each reverser door reaches approximately the axis of the exhaust nozzle and meets the pointed ends of the other doors. The side edges of adjacent deployed doors abut one another thereby forming a wall which blocks a significant portion of the gas stream and redirects it in a generally upstream direction through the cutouts in the nozzle flaps by means of the fore portion of each door.

It is contemplated that this invention is particularly advantageous for use with gas turbine engines requiring variable area convergent/divergent exhaust nozzles. Since the reverser doors are disposed entirely within the divergent flap portion of a convergent/divergent nozzle, it will be appreciated that this thrust reverser system need not have any effect on the operation of the convergent nozzle portion, and adds a minimum of complexity, weight, and drag to the variable area divergent nozzle flaps.

The foregoing and other objects, features and advantages of the present invention will become more apparent in the light of the following detailed description of the preferred embodiments thereof as shown in the accompanying drawing.

BRIEF DESCRIPTION OF THE DRAWING

FIG. 1 is a schematic side elevation view of a gas turbine engine incorporating the present invention.

FIG. 2 is a view taken along the line 2—2 of FIG. 1 showing the reverser doors in their open position above the engine centerline and in their closed position below the engine centerline.

FIG. 3 is a cross-sectional view taken along the line 3—3 of FIG. 2.

FIG. 5 is a cross-sectional view taken along line 5—5 of FIG. 2.

BEST MODE FOR CARRYING OUT THE INVENTION

Figure 4:
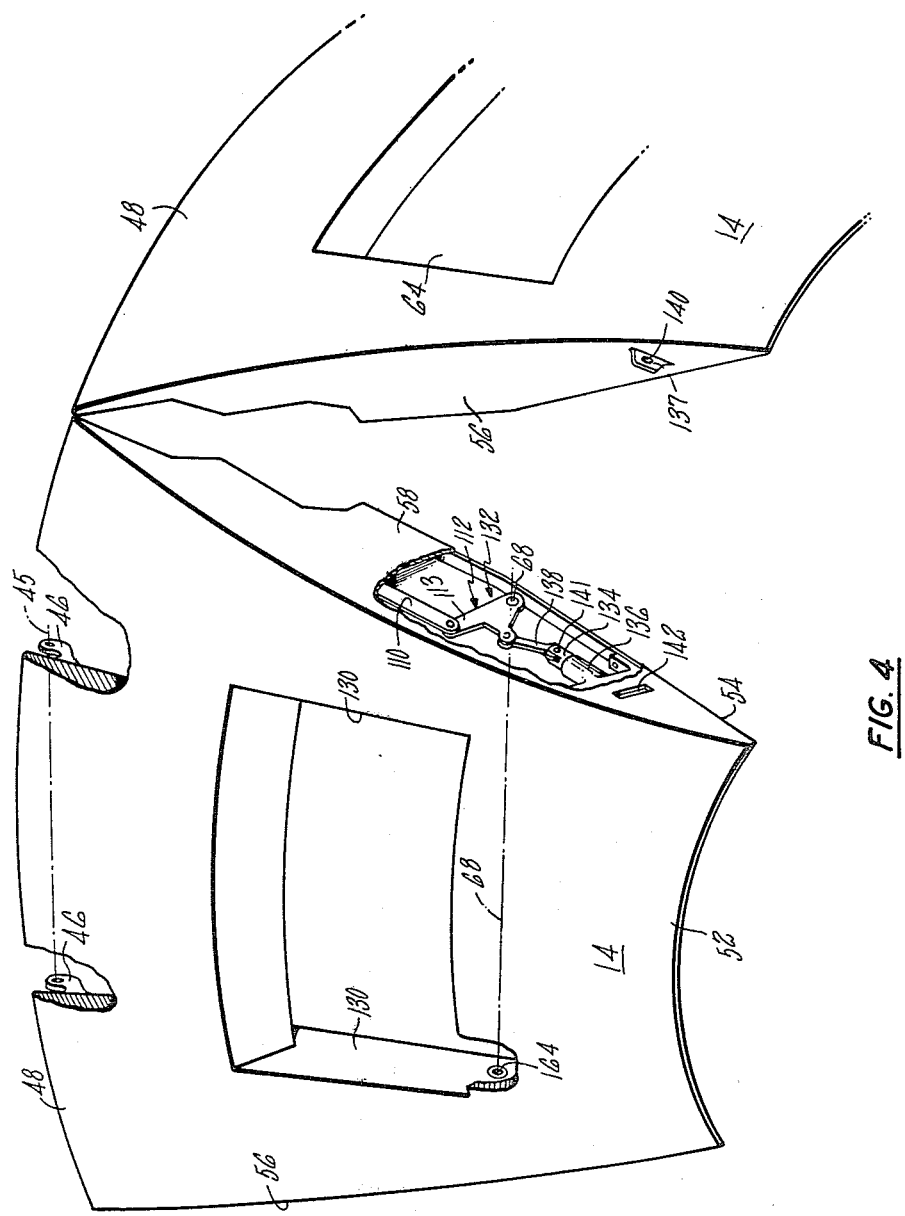
FIG. 4 is a perspective view, partly broken away, of the nozzle flaps in an open position with the reverser doors removed for clarity.

Referring to FIG. 1, a gas turbine engine incorporating the present invention is designated by the reference numeral 2 and includes a compressor section 4, a burner section 6, a turbine section 8, an exhaust section 10, and a divergent nozzle portion 12. The exhaust section 10 includes engine case structure 16. The divergent nozzle portion 12 comprises a plurality of divergent nozzle flaps 14 pivotally mounted to the aft end of the engine case structure 16 by means and in a manner which will be described hereinafter.

As best shown in FIG. 3, the engine case structure 16 includes a forward case portion 18 having a rearwardly and outwardly extending conically shaped portion 20 with an outwardly extending flange 22 at its aft end. The flange 22 is secured to a radially inwardly extending flange 23 of a rear case portion 21 of case structure 16 by bolts 24. An inner cooling liner 26 is positioned around and spaced from the inner side of the case portion 18. The engine also includes a variable area converging nozzle generally represented by the reference numberal 28. The convergent nozzle 28 and the divergent nozzle flaps 14 operate in conjunction with one another as a variable area convergent/divergent exhaust nozzle.

The construction and operation of the converging nozzle 28 is essentially the same as the variable area converging nozzle described in commonly owned U.S. Pat. No. 3,730,436 which is incorporated herein by reference. Briefly, a plurality of convergent nozzle flaps 30 are mounted for pivotal movement to the case structure 16. In this embodiment there are fifteen flaps 30, each pivotally mounted approximately one-third of the distance from its forward edge on a bracket member 32 secured to the rear case portion 21. Each flap 30 has an actuating device 33 mounted thereon which is connected to each adjacent flap 30 so that when all of the actuating devices 33 are moved, all of the flaps 30 are actuated in unison. An actuating link 34 is attached to each device 33. A portion of one link 34 is shown in the drawing. The links 34 extend forwardly to a common unison ring (not shown) which, in turn, is moved by a plurality of actuating cylinder and piston units (also not shown) which are mounted to the outside of the forward case portion 18. The actuating units move the links 34 forward and backward to position the flaps 30. A plurality of balance flaps 36 have their rearward ends pivotally connected to the forward end of main flaps 30 while their forward ends include roller means 38 attached thereto which move axially within track means 40. Each track means 40 is formed between a rearward extension of the forward case portion 18 and a rearward extension 42 of the conical portion 20. Further details of the actuating device 33 and other aspects of the nozzle 28 which are not described herein may be obtained from hereinabove referred to U.S. Pat. No. 3,730,436.

In U.S. Pat. No. 3,730,436 diverging nozzle flaps of the converging/diverging nozzle are shown pivotally attached to the rearward ends of converging flaps corresponding to the flaps 30 of the present embodiment. These diverging nozzle flaps are thereby directly actuated and positioned by movement of the converging flaps. In the present invention the diverging nozzle flaps 14 are not connected to the converging nozzle flaps 30. More specifically, referring to FIGS. 4 and 5, the divergent nozzle portion 12 comprises four adjacent axially extending flaps each including a pair of spaced apart support arms 46 pivotally mounted for rotation about an axis 45 to brackets 44 attached to the downstream end of the engine case structure 16.

The flaps of this embodiment are free to float during forward thrust operation and are positioned solely by aerodynamic loads. During reverse thrust operation the flaps are locked in a fully closed (minimum exit area) position by means which will be described hereinafter. Although not shown in this embodiment, seal means may be disposed between each pair of adjacent flaps 14 to minimize or prevent leakage between the flaps when they are open. To synchronize the motion of the flaps 14, the flaps may be connected to the seals with a linkage system that also serves as a seal retention system. Seal means of this type are well known in the art, and several configurations are shown in U.S. Pat. Nos. 2,972,226; 3,004,385; 2,697,907; and 2,910,828. The seal means are not required by this invention; and the incorporation thereof will depend upon the performance penalties associated with the leakage which would occur without the seals, balanced against the weight, complexity, and cost of incorporating such seals to avoid such penalties.

Referring to FIGS. 3 and 4, each axially extending diverging nozzle flap 14 includes an upstream portion 48, a downstream portion 50, an outer contoured surface 52, and side surfaces 56, 58. The outer surface 52 of the flaps provides a substantially smooth, low drag extension of the engine case structure 16 for all positions of the flaps. The downstream portion 50 includes an inner contoured surface 54. The upstream portion 48 of the diverging nozzle flaps 14 surround the downstream portion of the convergent nozzle flaps 30, while the inner surfaces 54 of the downstream portions 50 of the divergent nozzle flaps 14 define a divergent nozzle immediately downstream of the convergent nozzle 28. Each divergent nozzle flap 14 also includes a box-like cutout 64 (FIGS. 4 and 5) therethrough which houses a reverser door 66 pivotally mounted to the flap 14 for rotation about an axis 68. The doors are pivoted slightly upstream of their center of pressure to ensure that they return to the stowed position in the event of failure of the reverse thrust actuator. In FIG. 2, for purposes of explanation, the upper two doors 66A are shown fully deployed while the lower two doors 66B are shown stowed. In FIG. 5, the reverser door is shown in its fully deployed position.

Referring to FIGS. 2 and 5, each reverser door 66 includes an outer surface 70 and an inner surface 72. In its stowed position (bottom half of FIG. 2) these surfaces 70, 72 are substantially flush with the outer surface 52 and the inner surface 54, respectively, of the flap 14. The rearmost portion 146 of each door 66 is basically triangular in shape as viewed in a direction perpendicular to the top surface 70 of the door (see top half of FIG. 2). The triangular portion 146 of each flap 66 is stepped at 154 such that in its stowed position it tucks under the downstream end 156 of the flap structure. In the fully deployed position the vertex 148 of this triangular portion 146 lies essentially on the engine (i.e., nozzle) axis 149; and the edges 150, 152 (FIG. 2) of the triangular portion 146 abut, in sealing fashion, the corresponding edges of adjacent deployed doors 66. The portion of the door 66 upstream of the pivot axis 68 rotates outwardly away from the engine axis and opens the cutout 64. Thus, when fully deployed, the doors 66 substantially completely block the axial flow of gas rearwardly through the exhaust nozzle; and the curved inside surfaces 72 of the deployed doors 66 define a substantially solid conical wall tapered in a downstream direction and having its vertex on the engine axis. The axial flow of gas is thereby redirected in an upstream direction through the cutouts 64. It will be apparent to those skilled in the art that the doors 66 may, if desired, be partially deployed so that only a portion of the gas flow is redirected in an upstream direction.

Returning to FIG. 3, each reverser door 66 is operated by actuation system 100 comprising a ballscrew air motor driven actuator 102, connecting links 104, 106, 108 and 110, and reverser door actuating link 112 having an arm 113. The actuating link 112 pivots about the axis of rotation 68 of the reverser door 66. The connecting link 104 is pivotally connected at its forward end to the actuating rod 114 of the actuator 102. The rearward end of the link 104 is pivotally connected at 116 to the forward end of the link 106. The rearward end of the link 106 is pivotally connected at 118 to the forward end of the link 108, which has its rearward end pivotally connected at 120 to the forward end of the link 110. When the reverser doors are fully closed and the actuating rods 114 are fully withdrawn into the actuators 102, the pivot connections at 118 lie on the axis of rotation 45 of the flaps 14.

The pivot connections at 116 and 118 include rollers which ride in tracks 122, 124, respectively, mounted to the engine case structure 16. The pivot connection at 120 also defines a roller which rides in a track 126 which is a part of the flap 14. The rearward end of the connecting link 110 is pivotally connected at 128 to the end of arm 113 of the reverser door actuating link 112. Translation of the actuation rod 114 thereby results in rotation of the actuating link 112.

The actuating link 112 is disposed between the outer and inner surfaces 52, 54 and between the side wall 130 of the cutout 64 and the side surface 58 of the flap 14 (FIG. 4). Hinge pins (not shown) extend outwardly from each side of the reverser door 66 along the axis 68. The hinge pin nearest the side surface 56 of the flap 14 rotates within a journal 164 secured to the flap 14. The other hinge pin extends through the side wall 130 of the cutout 64 and is attached to the link 112 at its pivot point 68 such that as the link 112 is rotated by the actuation system 100 the flap is rotated from its stowed position within the cutout 64 to a fully deployed position (shown in FIG. 5) or to a position anywhere in-between.

As hereinabove discussed, the reverser doors 66 are only actuated when the flaps 14 are in their fully closed position. In order to assure that the flaps 14 remain closed during reverse thrust operation a locking mechanism 132 is provided to lock the flaps in the closed position prior to deploying the reverser doors. In this embodiment the locking mechanism 132 is directly interconnected with the reverser door actuation system 100. The locking mechanism 132 is best shown in FIGS. 3 and 4, and includes a pin 134 slidably disposed within a cylindrical sleeve 136 which is rigidly attached to the flap 14 downstream of the link 112 between the outer and inner flap surfaces 52, 54 and between the cutout wall 130 and side surface 58. A rod 138 is pivotally connected at its ends 139, 141 to the link 112 and to the pin 134, respectively. The pin 134 slides back and forth within the sleeve 136 upon rotation of the actuating link 112.

As best shown in FIG. 4, the side surface 56 of each flap includes a tang 137 extending perpendicularly outwardly therefrom. The tang 137 has a hole 140 therethrough which is just slightly larger than the forward end 143 of the pin 134. When the flaps 14 close such that the side surface 56 abuts the side surface 58 of an adjacent flap, the tang 137 fits into a slot 142 through the side surface 58 and is positioned such that the center of the hole 140 is aligned with the axis of the pin 134. Depending upon the position of the actuating link 112, the forward end 143 of the pin 134 is either withdrawn from the tang 138 allowing the flaps 14 to float open, or extends into the hole 140 in the tang 137 thereby locking the flaps closed.

When the actuating rod 114 is fully withdrawn into the actuator 102 the pin 134 is in the unlocked mode, the reverser doors are in their stowed position, and the flaps 14 are free to float open. When the airplane is about to land the flaps will be in their fully closed position. The links 112 are then rotated counterclockwise by operation of the actuators 102. A small amount of lost motion is built into the actuation system such that the first part of the counterclockwise rotation of the links 112 does not result in movement of the stowed reverser doors, but does result in the pins 134 moving into the holes 140 of their respective tangs 137 to lock the flaps closed.

Further counterclockwise rotation of the links 112 results in rotation of the reverser doors about the axes 68 with the pins 134 remaining in a locking mode in all deployed positions.

Although the embodiment described herein comprises a four flap floating divergent nozzle, it will be apparent to those persons skilled in the art that a nozzle in accordance with the principles of the present invention having thee or more flaps (with a corresponding number of reverser doors) may also be used. It is felt, however, that five flaps is a practical maximum in view of the added costs associated with the increased number of parts which would be required for greater numbers of flaps, which would not be offset by performance gains. Also, there is no reason why the position of the diverging flaps cannot be controlled by an actuator, rather than permitting them to float. Additionally, although only one particular mechanism for locking the flaps 14 closed has been described, other locking mechanisms may, of course, be used, and may be operated independently of the reverser door actuation system.

In its broadest aspects the prsent invention is directed simply to a variable area flap-type exhaust nozzle having thrust reverser doors built into the flaps. Thus, although this preferred embodiment shows a convergent-/divergent exhaust nozzle having both a variable area converging nozzle portion and a variable area diverging nozzle portion, the invention is not limited thereto. Other various changes and omissions in the form and detail of a preferred embodiment shown and described herein may also be made without departing from the spirit and scope of the invention.

I claim:

1. A thrust reverser/exhaust nozzle assembly for a gas turbine engine having an axis comprising:
    gas turbine engine exhaust case structure;
    first nozzle means including a plurality of axially extending flaps circumferentially disposed about the engine axis and mounted on said case structure, said flaps being movable between a closed position wherein they define a first exhaust gas flow path having a minimum exit area and an open position wherein they define an exhaust gas flow path having a maximum exit area, each of said flaps including a cutout therethrough; and
    a deflector door attached to each flap and movable between a stowed position wherein said door fits within and closes the said cutout and a deployed position wherein said door extends into the flow path and coacts with deployed doors of adjacent flaps to redirect at least a portion of the flow in an upstream direction through the said cutouts.

2. The nozzle assembly according to claim 1 wherein said flaps are hinged for rotation to said case structure at their upstream ends.

3. The nozzle assembly according to claims 1 or 2 wherein said flaps are free floating.

4. The nozzle assembly according to claims 1 or 2 wherein said first gas flow path is a divergent flow path, and each of said flaps includes a forward portion and a rearward portion, said rearward portion defining said divergent flow path, and said assembly includes variable area second nozzle means disposed radially inwardly of and surrounded by said forward portion of said flaps and defining a convergent exhaust gas flow path immediately upstream of said divergent gas flow path.

5. The nozzle assembly according to claims 1 or 2 wherein each of said doors is mounted for rotation within its respective cutout about a door axis, each of said doors having a forward portion extending upstream from said door axis and a rearward portion extending downstream from said door axis, wherein when said doors are in their fully deployed position their rearward portions extend radially inwardly into the gas flow path and sealingly engage adjacent deployed doors to define a wall which substantially blocks axial flow of exhaust gas and their forward portions extend radially outwardly and redirect gas flow through said cutouts in an upstream direction.

6. The nozzle assembly according to claim 3 including locking means for locking said flaps in said closed position when said doors are in a deployed position.

7. The nozzle assembly according to claim 5 including actuation means for rotating said doors about their respective door axes between their deployed and stowed positions.

8. The nozzle assembly according to claim 7 wherein said first nozzle means has only three or four of said flaps.

9. The nozzle assembly according to claim 7 wherein each of said flaps include axially extending side surfaces which abut the side surfaces of adjacent flaps when said flaps are in a closed position.

10. The nozzle assembly according to claim 9 wherein said flaps each have a radially outwardly facing external surface and radially inwardly facing internal surface, said internal surfaces defining the first nozzle means gas flow path, and said doors each have a radially outwardly facing surface and radially inwardly facing surface which, when said doors are in their stowed position are substantially flush with their respective flap external and internal surfaces.

* * * * *